United States Patent [19]
Finger

[11] Patent Number: 4,787,757
[45] Date of Patent: Nov. 29, 1988

[54] BEARING CONSTRUCTION WITH A CAGE PROVIDED WITH LUBRICATION GROOVES

[75] Inventor: Leslie D. Finger, Winsted, Conn.

[73] Assignee: The Torrington Company, Torrington, Conn.

[21] Appl. No.: 152,991

[22] Filed: Feb. 8, 1988

[51] Int. Cl.⁴ ............................................. F16C 33/66
[52] U.S. Cl. .................................. 384/470; 384/472; 384/572
[58] Field of Search ............... 384/470, 572, 472, 564, 384/571, 565, 475

[56] References Cited

U.S. PATENT DOCUMENTS

| | | | |
|---|---|---|---|
| 2,219,031 | 10/1940 | Frauenthal et al. | 384/572 |
| 2,897,024 | 7/1959 | Chenea | 384/470 |
| 3,350,147 | 10/1967 | Hingley | 384/472 |
| 3,674,356 | 7/1972 | Zeneski | 384/470 |

Primary Examiner—Lenard A. Footland
Attorney, Agent, or Firm—Frank S. Troidl

[57] ABSTRACT

The roller cage of a roller bearing has lubrication grooves extending at an angle across the radially inside surface of one of the cage annular end rings.

5 Claims, 1 Drawing Sheet

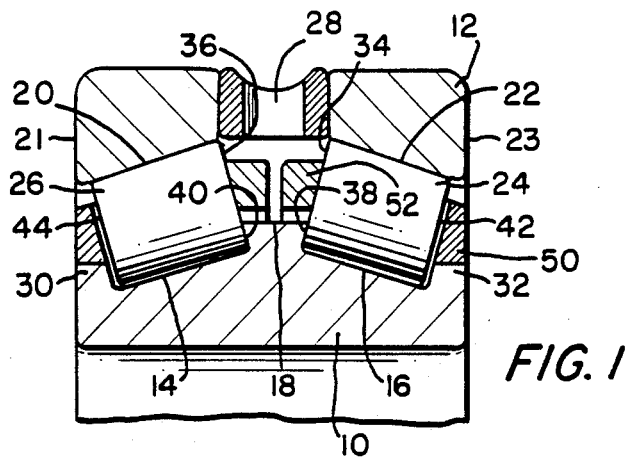
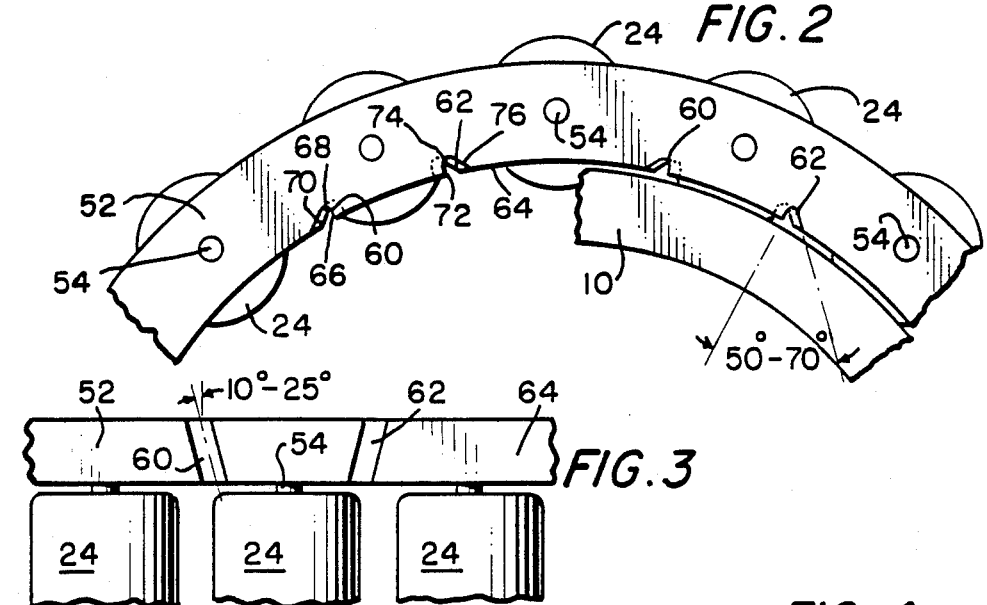
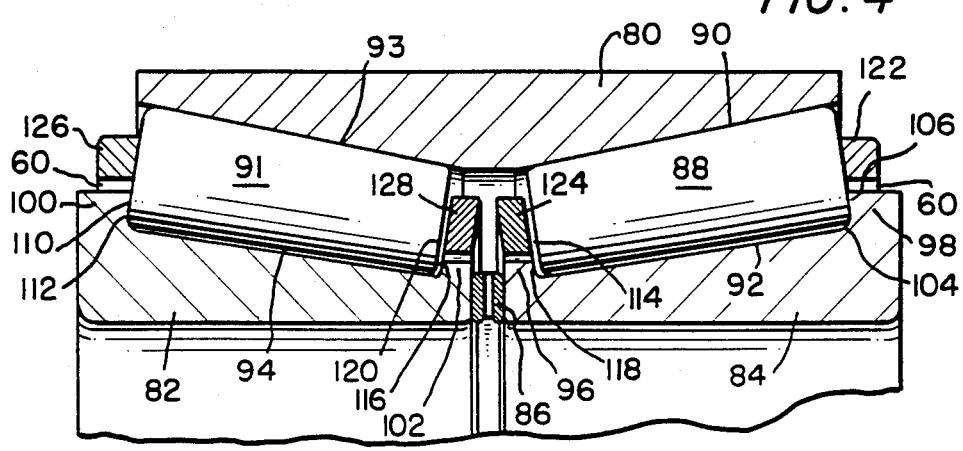

BEARING CONSTRUCTION WITH A CAGE PROVIDED WITH LUBRICATION GROOVES

This invention relates to roller bearings. More particularly this invention is a roller bearing having a roller and cage assembly with the cage provided with a novel structure for lubrication the rollers and the bearing races.

Many bearings include an inner race, an outer race, and a cage and roller assembly between the two races. Typically, one of the races has a raceway which is defined by axially separated flanges. In operation, often one end of each of the rollers will abut against one of the flanges and leave a slight clearance between the other end of each of the rollers and the other flange.

To provide proper lubrication, it is highly important that lubricant be forced between the roller-flange abutting surfaces and that this lubricant flow along the raceway. Some currently known bearings have cages with grooves to aid in the lubrication of the rollers and the raceways of a roller bearing. An example of such a bearing is shown in U.S. Pat. No. 2,219,031 granted Oct. 22, 1940 to H. Frauenthal, et al and entitled "Bearing Construction". However, in the Frauenthal, et al bearing, the major portion of the lubricant is not flowed between abutting surfaces and along the raceway. These are the surfaces which need the most lubricant.

This invention is a new roller bearing which includes a cage and roller assembly with the grooves located and shaped so that the major portion of the lubricant is forced to those areas of the rollers and raceways which need the lubricant most.

Briefly described, this invention is a roller bearing comprising a race having an annular raceway and an annular flange extending from one axial end of said annular raceway. A cage and roller assembly having a pair of axially spaced annular rings and a plurality of rollers supported by the rings is included in the bearing. One axial end of each of the rollers is adapted to abut the annular flange. The annular ring supporting that axial end of each roller which abuts the annular flange has angularly extending grooves extending across the radial surface facing the annular flange. The lubricant is forced through the grooves, between the annular flange and the abutting roller axial ends, and along the annular raceways.

The invention as well as its many advantages may be further understood by reference to the following detailed description and drawings in which:

FIG. 1 is a sectional view of a bearing showing one embodiment of the invention;

FIG. 2 is an enlarged fragmentary view showing in more detail the structure of the lubrication grooves on the cage;

FIG. 3 is a fragmentary internal plan view of the cage and roller assembly of FIG. 1 and FIG. 2; and FIG. 4 is a sectional view of a second preferred embodiment of bearing.

In the various figures, like parts are referred to by like numbers.

Referring to the drawings and more particularly to FIG. 1 the roller bearing comprises an inner race 10, an outer race 12 radially separated from the inner race. The inner race 10 is provided with a pair of axially extending raceways 14 and 16 separated by an annular flange 18.

Each of the raceways 14 and 16 tapers away from the annular flange 18.

A pair of axially separated raceways 20 and 22 are formed on the inside surface of the outer raceway 12. Outer raceways 20 and 22 taper axially inwardly from axial ends 21 and 23, respectively of outer raceway 12.

A cage assembly includes a plurality of taper rollers 24 which roll along inner raceway 16 and outer raceway 22. Also, a plurality of rollers 26 roll along inner raceway 14 and outer raceway 20. Lubricant enters the annular space between the inner and outer raceways through lubricant port 28 extending radially through outer raceway 12 to the annular space between rollers 24 and rollers 26.

A pair of annular flange 30 and 32 are provided at the ends of the inner race 10. During operation of the roller bearing, the forces on the bearing are such that the axial ends 34 and 36 of tapered rollers 24 and 26, respectively, will abut against the axially separated radially extending annular surfaces 38 and 40 of annular flange 18. Clearances (exaggerated for clarity) will exist between the axial ends 42 and 44 of rollers 24 and 26, respectively, and the generally radially extending flanges 32 and 30, respectively.

An axially separated pair of cage and roller assemblies, each consisting of annular axially spaced rings 50 and 52 are provided in the annular space between the inner race 10 and the outer race 12. The rollers are supported at their axial ends in the annular rings 50 and 52 by the pins 54, see FIG. 2 and FIG. 3.

It is extremely important that a major part of the lubricant be forced along the radially extending sides 38 and 40 and the annular raceways 14 and 16. These surfaces are the surfaces contacted by rollers 24 and 26. Referring to FIG. 2 and FIG. 3., a plurality of circumferentially separated grooves 60 and 62 extend angularly across the radially inner surface 64 which faces the annular flange 18. Similar circumferentially separated grooves are provided on the radially inner surface of the annular ring facing the annular flange 18 and is part of the other cage. With the provision of these grooves, the major part of the lubricant fed through the lubricant hole 28 is forced through the grooves, between the annular flange 18 and the abutting roller axial ends, and along the annular raceways 14 and 16.

Grooves 60 and 62 extend in opposite angular directions along the radial surface 64 of the annular ring 52. In the embodiment shown in FIG. 2 and FIG. 3, a pair of grooves 60 and 62 are provided for certain predetermined rollers. Alternate rollers are provided with a pair of grooves 60 and 62. When the outside race and cage rotate in the clockwise direction looking at FIG. 2, lubricant will be forced through the groove 62; when the outer race and cage rotate in the counterclockwise direction, the lubricant will be forced through groove 60. Thus, the appropriate parts of the bearing are lubricated regardless of which direction the outer race end cage rotate.

As can be seen from FIG. 3, the grooves 60 and 62 are located on the annular cage ring so that the lubricant will exit from either groove 60 or 62 depending upon the direction of rotation and flow along the axial ends of the rollers 24 which is in contact with the flange 18. This again helps to force the lubricant to those areas of the bearing which needs it most.

Preferably, grooves 60 and 62 extend across the annular ring radially inner surface in opposite directions at an angle ranging from 10° to 25° with respect to a radial plane through the axis of the bearing. In cross-section, each groove 60 is formed by a radially extending front wall 66, a curved bottom wall 68 and a back wall 70 extending from the curved bottom wall at an angle preferably ranging from 50° to 70° with respect to a radial plane through the axis of the bearing. In cross-section, each groove 62 is formed by a radially-extending front wall 72, a curved bottom wall 74, and a back wall 76 extending from the curved bottom wall at an angle preferably ranging from 50° to 70° with respect to a radial plane through the axis of the bearing.

In the embodiment shown in FIG. 4, the bearing comprises an outer race 80 and a pair of inner races 82 and 84 separated by an annular spacer 86. Tapered rollers 88 roll along raceways 90 and 92 on the outer race 80 and inner race 84, respectively. Tapered rollers 91 roll along raceways 93 and 94 on the outer race 80 and inner race 82, respectively.

Raceway 92 is formed by axially spaced annular flanges 96 and 98 on inner race 84. Raceway 94 is formed by axially spaced annular flanges 100 and 102 on inner race 82. When the outer race 80 rotates, the forces are such that the axial edge 104 of tapered roller 88 abuts against the generally radially extending annular surface 106 of the flange 98. Also, the axial edge 110 of the tapered roller 91 abuts against the generally radially extending surface 112 of the annular flange 100. Clearances 114 and 116, (exaggerated in the figures) will exist between the tapered rollers and the annular radially extending surface 118 of flange 96 and the radially extending edge 120 of flange 102.

Tapered rollers 88 form part of a cage and roller assembly including annular end rings 122 and 124; tapered rollers 91 are part of a cage and roller assembly including annular end rings 126 and 128.

Annular end rings 122 and 126 have their inner surfaces which face annular flanges 98 and 100, respectively, provided with circumferentially separated grooves. Only one groove 60 is shown in each annular ring 122 and 126 in FIG. 4. However, there are a plurality of grooves which are formed in the same manner and with the same shape as the grooves 60 and 62 shown in FIG. 2 and FIG. 3. Thus, lubricant which is fed from the outside of the bearing into the annular spaces between the outer race and the inner race is forced through the grooves 60 and 62 and along radially extending surfaces 106 and 112 and the annular raceways 92 and 94. It is along these surfaces that the bearing needs the lubricant the most.

I claim:

1. A roller bearing comprising: a race having an annular raceway and an annular flange extending from one axial end of said annular raceway; a cage and roller assembly having a pair of axially spaced annular rings and a plurality of rollers having their axial ends supported by said rings; one axial end of each of said rollers adapted to abut the annular flange, the annular ring supporting that axial end of each roller which abuts the annular flange having angularly extending grooves extending across the radial surface facing said annular flange for forcing lubricant through said grooves, between the annular flange and the abutting roller axial ends, and along the annular raceway.

2. A roller bearing in accordance with claim 1 wherein: the inside diameter of the annular ring having the angularly extending grooves is larger than the outside diameter of the annular flange and the angularly extending grooves are in the radially inner surface of the annular ring.

3. A roller bearing in accordance with claim 2 wherein: alternate grooves extend in opposite angular directions whereby lubricant will be forced through those grooves extending in one angular direction when the cage rotates clockwise, and lubricant will be forced through those grooves extending in the opposite angular direction when the cage rotates counter-clockwise.

4. A roller bearing in accordance with claim 3 wherein the grooves extend across the annular ring radially inner surface at an angle ranging from 10° to 25°.

5. A roller bearing in accordance with claim 4 wherein in cross-section each groove is formed by a radially extending front wall, a curved bottom wall, and a back wall extending from the curved bottom wall at an angle ranging from 50° to 70° with respect to a radial plane through the axis of the bearing.

* * * * *

UNITED STATES PATENT AND TRADEMARK OFFICE
CERTIFICATE OF CORRECTION

PATENT NO. : 4,787,757
DATED : November 29, 1988
INVENTOR(S) : Leslie D. Finger, et al It is certified that error appears in the above—identified patent and that said Letters Patent is hereby corrected as shown below:

On title page, item [75] should read as following:

Inventors: Leslie D. Finger, Winsted, CT; Karl Wickenheisser, San Ramon, CA.

Signed and Sealed this

Fourteenth Day of June, 1994

Attest:

BRUCE LEHMAN

Attesting Officer

Commissioner of Patents and Trademarks